Aug. 30, 1932. F. SOUTHWELL 1,875,182
FISHHOOK
Filed May 9, 1931

INVENTOR
Frank Southwell.
by:- A. E. O'Dell
Attorney.

Patented Aug. 30, 1932

1,875,182

UNITED STATES PATENT OFFICE

FRANK SOUTHWELL, OF REDDITCH, ENGLAND, ASSIGNOR TO O. MUSTAD & SON, OF OSLO, NORWAY

FISHHOOK

Application filed May 9, 1931. Serial No. 536,095.

This invention relates to fish hooks having three or more barbs diverging at roughly equal intervals around a central stem. For brevity these are herein referred to as 'multiple fish hooks'.

The object of the invention is to produce a multiple fish hook without brazing or other operation involving heating likely to damage the temper of the hook.

It is easy to make two barbs in one piece by doubling on itself a member barbed at each end, and twisting the hooked ends so that they lie side by side at an appropriate angle, i. e. of 120° in the case of a treble or three-barbed hook, and 90° in the case of a four barbed hook. To complete the hook a second barbed member is attached to such a doubled member and fixed in appropriate position relatively to it solely by resilient engagement with it; that is to say one or other member is sprung (or both members are sprung) into engagement with the other in such a way that they can neither slide parallel to each other, nor rock one about the other to more than a slight and insignificant extent.

A convenient form of engagement consists in first looping the additional barbed member around the bight of a doubly barbed member doubled on itself. This attaches the two components together as well as providing an eye for the attachment of a line; but leaves each member free to swing relatively to the other about their points of attachment. To complete the attachment the additional member is shaped to engage between the limbs of the doubled stem of the other at a distance from the bight. This makes the stem parts of both components lie close side by side, and also hinders more than a very slight relative rotation about the axes of the stems.

By way of example a treble hook constructed according to the invention is illustrated in the accompanying drawing.

Figure 1:
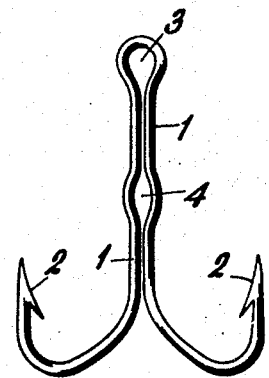
Figure 1 shows in elevation a doubly barbed component doubled on itself.
Figure 2:
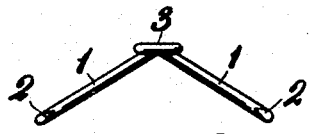
Figure 2 is a plan of this component.
Figure 3:
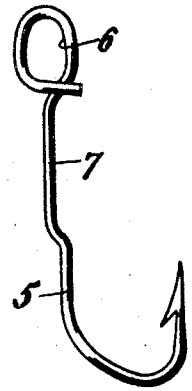
Figure 3 shows in elevation an additional component with a single barb.

The component shown in Figure 1 is made by doubling on itself a wire 1 having a barb 2 at each end, bending the ends to form hooks, and twisting these hooks so that they stand at an angle of about 120° as seen in Figure 2. In the course of doubling, in addition to forming a bight 3 in the middle of the wire, there is formed an eye 4 at a distance from the bight, say about half way along the doubled stem portion of the component. The single barbed component 5 is bent to form a hook at its barbed end, and bent into a loop 6 at the other end, the parts of the wire being in contact where they cross so that the loop is completely closed. In addition a part 7 of the otherwise straight stem of this component is offset from the remainder by two bends, one adjacent the loop and one in position corresponding to the eye 4, say half way along the stem.

Figure 4:
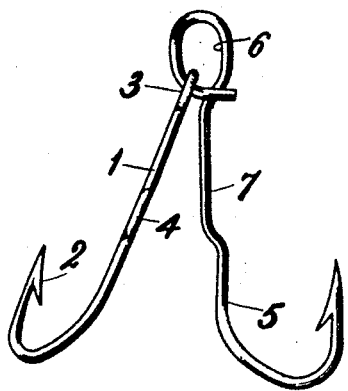
Figure 4 shows the additional component in looped engagement with the doubled component.
Figure 5:
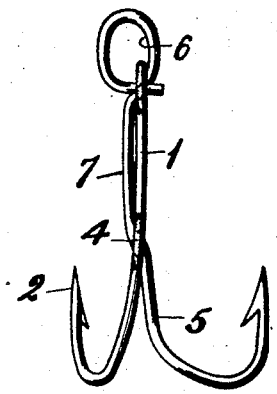
Figure 5 shows the two components completely engaged and fixed realtively to each other.

The bight 3 can be passed over the component 5 from one end and sprung into the loop 6 as seen in Figure 4. The two components are then resiliently engaged together, that is to say they cannot be disengaged save by using the elastic yield of the material and springing open the loop 6 or springing apart the limbs of the doubled stem. But as yet the two components can swing relatively to each other about their engaged ends. By springing apart the two limbs of the doubled stem the offset portion 7 of the second component may be passed between them, so that this offset portion comes to lie on one side of the doubled stem and the remainder of the single stem on the other side, as seen in Figure 5, the junction of these two parts passing through the eye 4.

Such resilient engagement practically prevents relative movement of the two components. They cannot slide lengthwise relatively to each other, for that is prevented by the loop 6 and the eye 3. The single barbed member cannot swing clockwise in Figure 5 because the part 5 cannot pass the contacting lower ends of the doubled stem; it cannot swing anti-clockwise because the part 7 cannot pass the contacting upper ends of the doubled stem. And the components cannot turn relatively to each other about the axis of either stem or any adjacent axis because the eye 4 and the bight 3 will only allow slight turning of the parts passing through them. Thus the single barb is fixed beside and at approximately 120° to the barbs 2.

It will be understood that the invention is not limited to the particular form of component members above described; all that is essential is that the two components should be resiliently engaged so that they have practically no freedom of relative movement, and the barbs stand in the desired relation to each other. By employing two double barbed components a quadruple hook may be made in similar fashion.

I claim:

1. A multiple fish hook comprising a member barbed at each end doubled upon itself and twisted so that the barbs lie side by side at an appropriate angle, and a second barbed member looped around the bight of the first and also passed between the limbs of its doubled stem at a distance from the bight, so that the two members can neither swing nor slide relatively to each other to any considerable extent.

2. A multiple fish hook comprising a doubly barbed member bent upon itself to present two co-planar loops, and a second barbed member passed through said loops, and itself looped around one of them.

3. A multiple fish hook comprising a plurality of resilient members, one member having at least two hooks, the other member having at least one hook, and means for resiliently engaging said members with each other.

In testimony whereof I have signed my name to this specification.

FRANK SOUTHWELL.